United States Patent [19]
Newton

[11] 3,977,637
[45] Aug. 31, 1976

[54] UTILITY IMPLEMENT HOLDER
[75] Inventor: Tommy J. Newton, Easley, S.C.
[73] Assignee: Thomas M. Hughes, Taylors, S.C.
[22] Filed: Dec. 16, 1974
[21] Appl. No.: 532,931

[52] U.S. Cl............... 248/514; 248/349; 248/538
[51] Int. Cl.² ....................... A47G 25/12
[58] Field of Search ............. 248/38–47, 248/80–82, 309, 314, 310, 311, 313, 316 R, 346, 349; 43/21.2

[56] References Cited
UNITED STATES PATENTS

| | | | |
|---|---|---|---|
| 1,534,642 | 4/1925 | Hoagland | 248/42 |
| 2,513,475 | 7/1950 | Grevich | 248/42 |
| 2,542,253 | 2/1951 | King | 248/42 |
| 2,576,212 | 11/1951 | Carter | 248/42 |
| 2,581,691 | 1/1952 | Katter | 248/42 |
| 2,598,021 | 5/1952 | Schwanke | 248/40 X |
| 2,722,727 | 11/1955 | Scheifele | 248/42 X |
| 2,883,133 | 4/1959 | Zarate | 248/44 |
| 2,893,667 | 7/1959 | Schumaker | 248/40 |
| 2,973,930 | 3/1961 | Smith | 248/40 |
| 2,992,505 | 7/1961 | Bowker | 43/21.2 |
| 3,031,048 | 4/1962 | Katter | 248/42 |
| 3,162,408 | 12/1964 | Markman | 248/40 |
| 3,570,793 | 3/1971 | Shackel | 248/42 |
| 3,652,049 | 3/1972 | McCown | 248/310 |

Primary Examiner—Roy D. Frazier
Assistant Examiner—Terrell P. Lewis
Attorney, Agent, or Firm—Bailey & Dority

[57] ABSTRACT

A holder device is provided for supporting a utility implement such as a fishing rod and a lantern, comprising a base member adapted to be mounted on a side of a boat and the like, having an elongated socket formed therein, a removable coupling member for removably carrying the fishing rod or lantern including an arm element having a cam portion formed adjacent an outer end thereof which is slideably engaged in said elongated socket, and a resilient biasing means carried by the base member providing a biasing force against a surface of the arm element cooperating with the cam portion so as to hold the arm element in the elongated socket. Thus, the coupling member is effectively prevented from being removed from the base member unless the coupling member and its associated implement is tilted angularly backwards and simultaneously pulled outwardly from the base member to overcome the resilient biasing means and release the cam portion from the socket.

8 Claims, 7 Drawing Figures

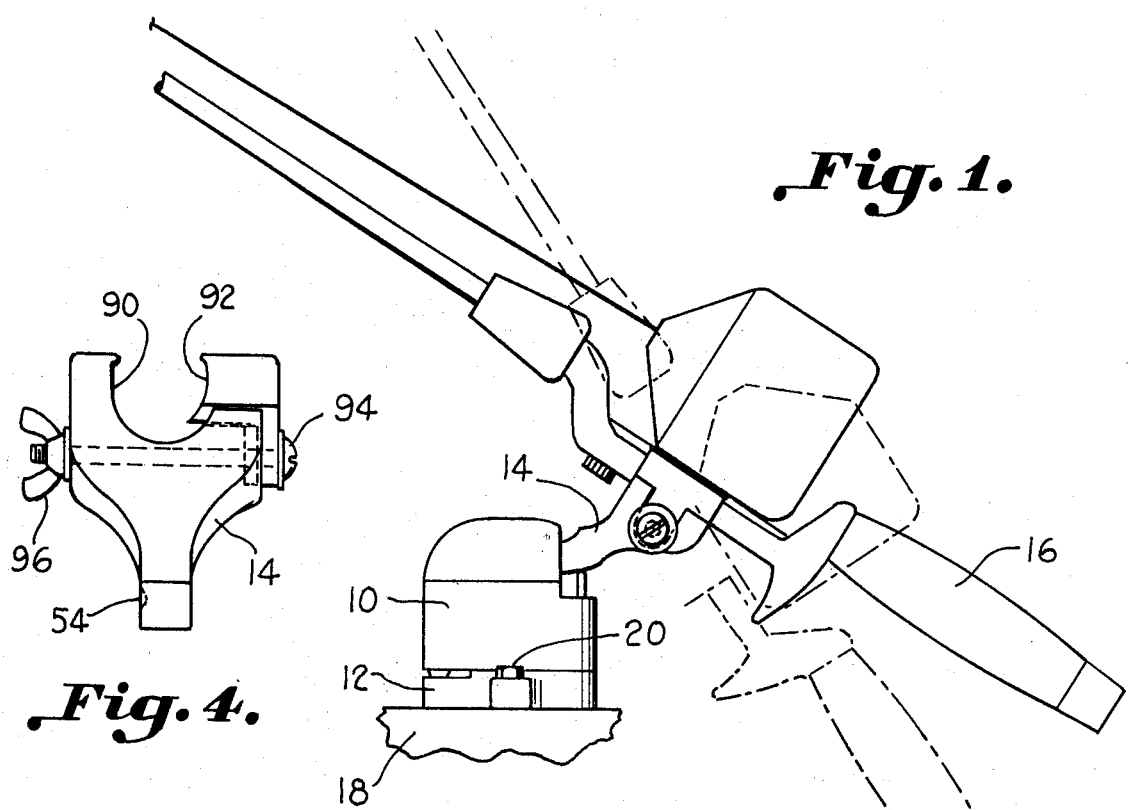
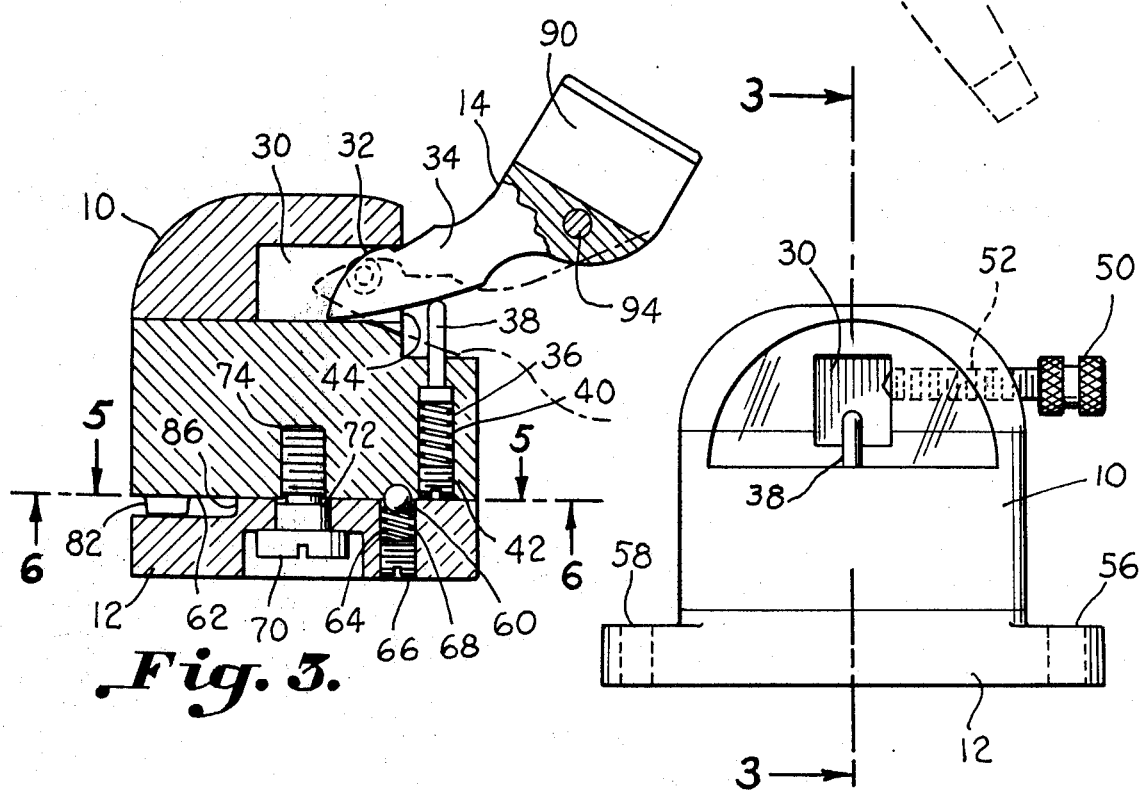

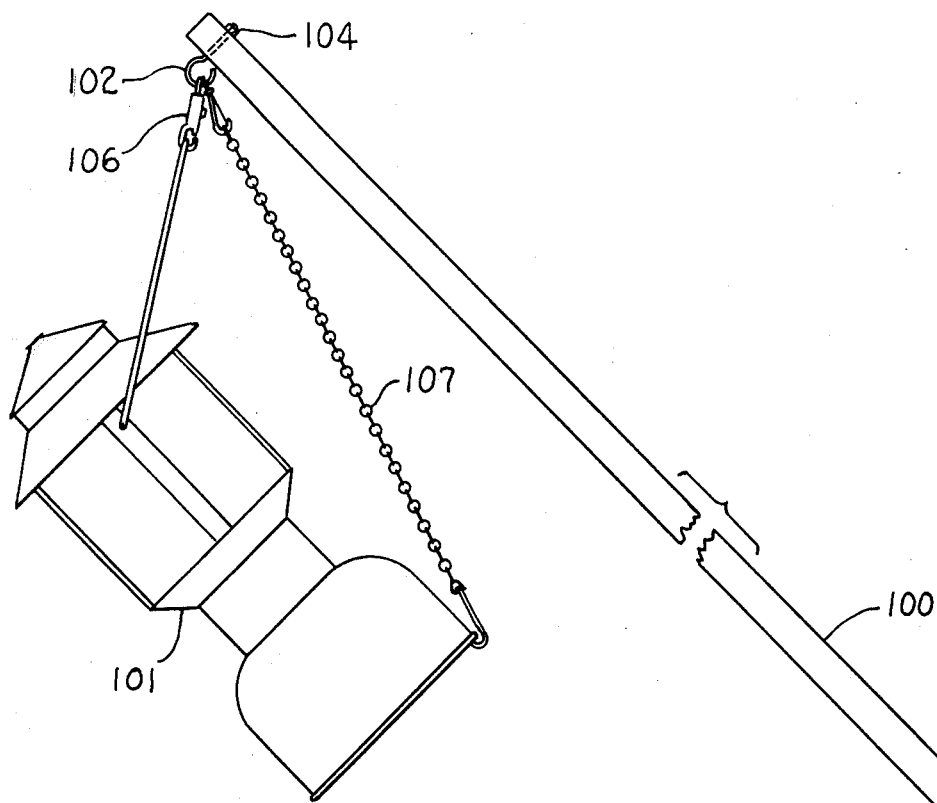
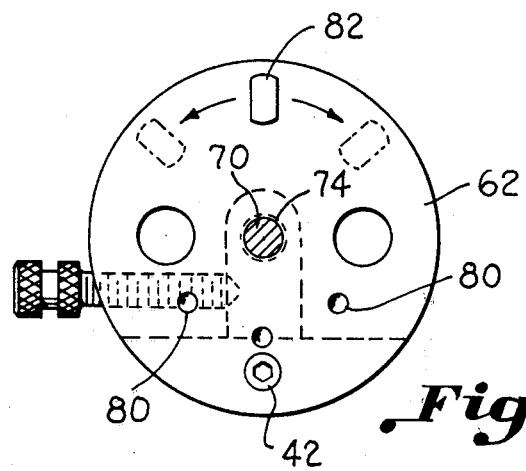
Fig. 6.
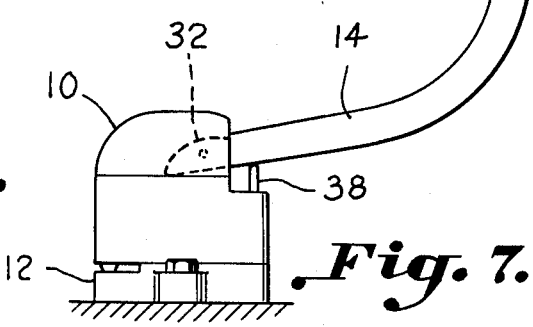
Fig. 7.
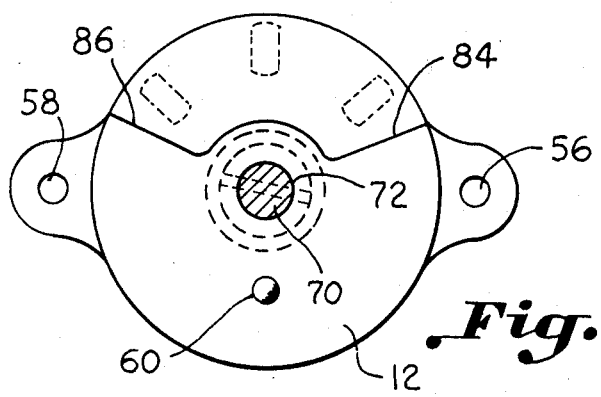
Fig. 5.

UTILITY IMPLEMENT HOLDER

BACKGROUND OF THE INVENTION

The invention relates to a device for holding a fishing rod and a lantern or other utility implement so as to prevent removal of the fishing rod unless the fishing rod is tilted at a backward angle and pulled outwardly at the same time. The resulting action duplicates the natural motion that is necessary to set a hook in the mouth of a fish while keeping the fishing line tight.

Prior devices have been developed for holding fishing rods such as U.S. Pat. Nos. 2,992,505 and 2,513,475, wherein a base member holds a removable coupling member to which the fishing rod is attached. To remove the fishing rod from the base member, it is necessary to either raise the fishing rod straight up vertically or pull the fishing rod in a straight backward motion. Neither motion corresponds to the natural motion for setting the hook in the mouth of the fish. It is also possible with either motion that slack may occur in the fishing line with the possible result that the hook will come out of the mouth of the fish or that when the hook is set, the line will break due to the slack.

Another fishing rod holder is shown in U.S. Pat. No. 2,542,253 wherein a C-ring is clamped to the side of a boat and a hook member made integral with the handle of the fishing rod is inserted into a pair of slots formed in the C-ring. Due to the arcuate shape of the hook member, the fishing rod will tilt upwardly when the line is pulled by a fish. The handle of the fishing rod cannot be removed from the rod holder until the rod is tiled upwardly at a substantial angle which is the proper angle for reeling in the fish. While the fishing rod must be tilted upwardly to remove it from the C-ring holder, it cannot be pulled straight backwardly to take the slack out of the line until the hook member has cleared the holder. Therefore, it is possible that in tilting the rod upwardly to remove it from the holder, the hook will not become set in the fish's mouth or slack in the line might cause the line to break when the hook is set.

SUMMARY OF THE INVENTION

The invention is for a holder device for supporting a utility implement such as a fishing rod and lantern including a base member adapted to be mounted on the side of the boat and the like, including an elongated horizontal socket formed therein having an entrance opening. A removable coupling member is adapted to removably carry the fishing rod and the like and includes an arm element having a cam portion formed adjacent an outer end of the arm element which is slidably engaged in the elongated socket of the base member. A resilient biasing means provides a biasing force against the surface of the arm element when inserted in the elongated socket to cooperate with the cam portion in holding the arm element in place in the socket. Thus, the coupling member and the implement attached thereto is prevented from being removed from the base member unless the implement and coupling member is tilted angularly backward and simultaneously pulled outwardly from the base member to overcome the resilient biasing means releasing the cam portion of the arm element from the socket. The resulting action simulates the natural action that would occur if one was to raise a fishing pole freely to set the hook in the fish's mouth while preventing slack from occurring in the fishing line.

Accordingly, an important object of the present invention is to provide a holder device for a utility implement such as a fishing rod and lantern wherein the implement is prevented from removal unless it is tilted upwardly backward and simultaneously pulled outwardly from the holder device.

Another important object of the present invention is to provide a device for holding a utility implement wherein the implement can be quickly released from the holder device allowing control over the implement at all times.

Still, another important object of the present invention is to provide a holder device for utility implement such as fishing rods and lanterns wherein the implement may be rotated to any one of a number of preset angular positions.

Still, another important object of the present invention is to provide a holder device including a coupling member that provides a smooth camming action in releasing the coupling member from the holder device, thus eliminating any jerking type of motion.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a side elevational view illustrating a holder device constructed in accordance with the present invention holding a fishing rod, FIG. 2 is a rear elevational view of the base member of FIG. 1 with the coupling member removed therefrom, FIG. 3 is a sectional view taken along the line 3—3 of FIG. 2, FIG. 4 is a front elevational view of the removable coupling member of FIG. 1 constructed in accordance with the present invention, FIG. 5 is a sectional view taken along line 5—5 of FIG. 3, FIG. 6 is a sectional view taken along line 6—6 of FIG. 3, and FIG. 7 is a side elevational view illustrating a holder device constructed in accordance with the present invention holding a lantern.

DESCRIPTION OF A PREFERRED EMBODIMENT

The drawings illustrate a holder device which may be mounted to the side of a boat and the like for supporting a utility instrument such as a fishing rod and lantern.

Referring in more detail to FIG. 1 of the drawing, there is illustrated a holder device which includes a base member 10 which is rotatably mounted on a base plate 12 for rotation between a plurality of preset angular positions, and a removable coupling device 14 which is shown carrying a fishing rod 16. The base plate 12 may be attached to the side of a boat 18 by use of fastening means, such as screws 20, or may be attached to any supporting structure as desired. It may also be desirable to substitute for the screw fastening means 20 a less permanent fastening means, such as a clamp arrangement.

The base member 10 includes an elongated horizontal socket 30 formed therein for receiving a cam portin 32 formed adjacent an outer end of an arm element 34 of the removable coupling member. A bore 36 formed in the base member provides a housing for a spring-loaded plunger member 38 which is urged upwardly by the spring 40 to engage the underneath side of the arm element 34 providing a biasing force thereagainst. A set screw 42 closes the bore 36 holding the spring in place and permitting replacement and adjustment of the spring. The spring loaded plunger member cooperates with the cam portion 32 of the coupling member 14 to hold the coupling member in the elongated socket 30 and provides for a smooth release of the coupling member from the socket in a manner to be more fully explained later. The plunger member 38 extends vertically to engage the underneath portion of arm element 34 adjacent an entrance opening 44 of the elongated socket 30.

As best seen in FIG. 2, a threaded lock pin member 50 is received in a threaded bore 52 formed in the base member and extends through the base member into the opening of the elongated socket 30 formed in the base member. The lock pin member may be turned slightly inwardly so as to engage a side surface of the arm element 34 to lock the arm element in place in the socket and prevent removal therefrom. A slight indenture 54 may be formed in the side of the arm element 34 to receive the end of the lock pin member 50 to cooperate for locking the arm element in place. The lock pin member is provided with threads so that it may be locked and unlocked by a very slight turn such as a quarter of a turn so that the lock pin member may be unlocked quickly permitting the arm element to be released and removed quickly therefrom. Screw holes 56 and 58 are provided in base plate 12 for fastening the base plate and base member to a suitabale structure such as the side of a boat, or if desired, less permanent attaching means may be provided such as a clamp arrangement.

The base member 10 is rotatably mounted on base plate 12 as is best seen in FIGS. 3 and 5 through 6. The base plate 12 carries a spring loaded ballbearing member 60 which is forced upwardly against the bottom portion 62 of the base member 10 by a spring 64. A threaded plug 66 holds the spring and ballbearing arrangement together in a bore 68 formed in base plate 12. A threaded bolt 70 extends through a central aperture 72 formed in base plate and is received in an aligned, threaded central aperture 74 formed in the base member 10 for securing the base member and base plate together. As shown in FIG. 6, a plurality of indentures 80 is provided in the bottom surface 62 of the base member 10 for receiving the ballbearing member 60. As the base member 10 is rotated on the base plate 12 the ballbearing 60 is allowed to run through the trace of the indentures 80. Each indenture provides a preset angular positioning of the base member relative to the base plate as the ballbearing is allowed to set in each indenture. By rotating the base member relative to the base plate the ballbearing is depressed until the base member is rotated to a different indenture. A tab member 82 is formed on the bottom portion 62 of base member 10 providing a stop member which abuts a side portion 84 or 86 of a carved out portion of the base plate 12 preventing the base member 10 from being rotated past the outermost of the indentures 80.

When the holder device as thus described is used for holding a fishing rod, a removable coupling member is provided as shown in FIG. 4. The coupling member 14 preferably includes an upper clamping member having a leg 90 which is formed integral with the coupling member and an opposed leg 92 made adjustable so as to move towards and away from leg 90 to clamp a variety of fishing rod sizes. The adjustable clamping leg 92 slides in a groove formed in the coupling member 14 and a threaded bolt 94 extends through the adjustable clamping member 92 and through the coupling member 14. A suitable fastening means, such as wing-nut 96 is received over the threaded portion of bolt 94 and when tightened, draws the leg members 90 and 92 together so as to clamp the fishing rod held therebetween tightly in place. While this is a preferred form of the clamping arrangement for holding a fishing rod, other types of clamping arrangements may also be used.

When the holder device constructed in accordance with the present invention is used to support a lantern, a modified form of the coupling member 14 is used which includes an upper arm member 100 extending upwardly and away from the base member a sufficient distance so as to permit a lantern to be supported above the base member. A suitable hook member 102 is carried adjacent the uppermost end of extended arm 100 and is fastened thereto by using a suitable fastening nut 104. A conventional snaphook 106 is used for holding the handle of the lantern and a similar snaphook and chain arrangement 107 is used for holding the bottom of the lantern so as to tilt the lantern for shining downwardly into the water or other surface to be illuminated.

Referring now in detail to FIG. 3, the operation of the holder device is illustrated wherein the removable coupling member 14 is inserted in place in the elongated socket 30. When it is desired to remove the coupling member 14, the coupling member and the attached fishing rod are pulled angularly backwards to the dotted line position shown in FIG. 3 and simultaneously pulled outwardly from the socket. This combination of action depresses the plunger 38 and at the same time releases the cam portion 32 from the socket in a smooth action preventing any jerking motion as a result of the cam portion 32 riding against an upper surface of the socket 30. The manner of removal simulates the natural motion that would take place when one raises a fishing rod to set a hook in the mouth of a fish and at the same time to tighten the line to prevent slack from occurring. When used for holding a lantern, the holder device prevents the lantern and the coupling member 14 from being removed by pulling downwardly or forwardly and provides a smooth removal action so as not to jerk and cause the lantern held thereby to become dislodged. When the arm element 34 of the removable coupling member is inserted in the socket 30, the spring loaded plunger 38 pushes the arm element upwardly and cooperates with the cam portion 32 to hold the arm element securedly in place in the socket. The coupling cannot be removed by a foward or downward pulling but only by a backward angular tipping and simultaneous outward pulling of the coupling member. In addition, when it is desired to permanently lock the coupling member in the elongated socket the lock pin member 50 may be rotated into the locking position.

While the holder device has been disclosed for holding a fishing rod or a lantern, it is obvious that the holder device may be used for holding a number of devices and utility implements by providing different clamping means or carrier means on the removable coupling member 14. For example, the holder device could be used to hold a removable coupling member having a upwardly extending member such as member 100 for holding containers of blood during blod transfusions and the like thereby providing a coupling member which can be smoothly removed from the base member. The holder device may be used for many purposes, and particularly where it is desirable to have a smooth engagement and release of the removable coupling member holding the desired object.

While a preferred embodiment of the invention has been described using specific terms, such description is for illustrative purposes only, and it is to be understood that changes and variations may be made without departing from the spirit or scope of the following claims.

What is claimed is:

1. A holder device for supporting a utility implement such as a fishing rod and lantern comprising:
    a base member adapted to be mounted on a side of a boat and the like including an elongated substantially horizontal socket formed therein having an entrance opening,
    a releasable coupling member adapted to removably carry said implement having an arm element rigidly depending downwardly therefrom being received in said socket,
    a cam portion formed adjacent an outer end of said arm element being slideably received and engaged in said elongated socket,
    resilient biasing means positioned adjacent said entrance opening providing an upward biasing force against a surface of said arm element to hold said arm element in the elongated socket,
    said arm element and hence said coupling member being releaseably secured in said elongated socket and base member until said arm element is tilted angularly backwards to depress said upward biasing means permitting said cam portion to ride against an upper surface of said socket when being pulled outwardly therefrom.

2. The device of claim 1 wherein said base member includes locking means for permanently locking said arm element in said socket.

3. The device of claim 2 wherein said locking means includes a lock pin member extending through said base member into said elongated socket being manually movable in and out of engagement against said arm element so as to lock and release said arm element in said elongated socket, respectively.

4. The device of claim 1 further including a base plate adapted to be carried by the side of a boat and the like, said base member being swivelably mounted on said base plate between a plurality of preset angular positions.

5. The device of claim 3 wherein said arm element has an indenture formed in one side thereof for receiving one end of said lock pin member so as to lock said arm element in said socket.

6. The device of claim 1 wherein said means for providing a resilient biasing force includes a spring-loaded, vertical plunger member carried by said base member adjacent said entrance opening providing a biasing force against a surface of said arm element.

7. The device of claim 1 wherein said releaseable coupling member includes a clamping member for receiving and firmly holding a fishing rod comprising a first upwardly extending leg, a second upwardly extending leg movably carried on said coupling member for movement towards and away from said first leg, means connected to said first and second legs for tightening said legs towards each other and against the fishing rod held therebetween.

8. The device of claim 1 wherein said released coupling member includes an upper arm member extending upwardly a sufficient distance for supporting a lantern above said base member, a hook means adjacent the end of said upper arm member for receiving and securedly holding the lantern in a tilted position.

* * * * *